(No Model.)
H. BUNKER.
CLUTCH.
No. 488,383. Patented Dec. 20, 1892.
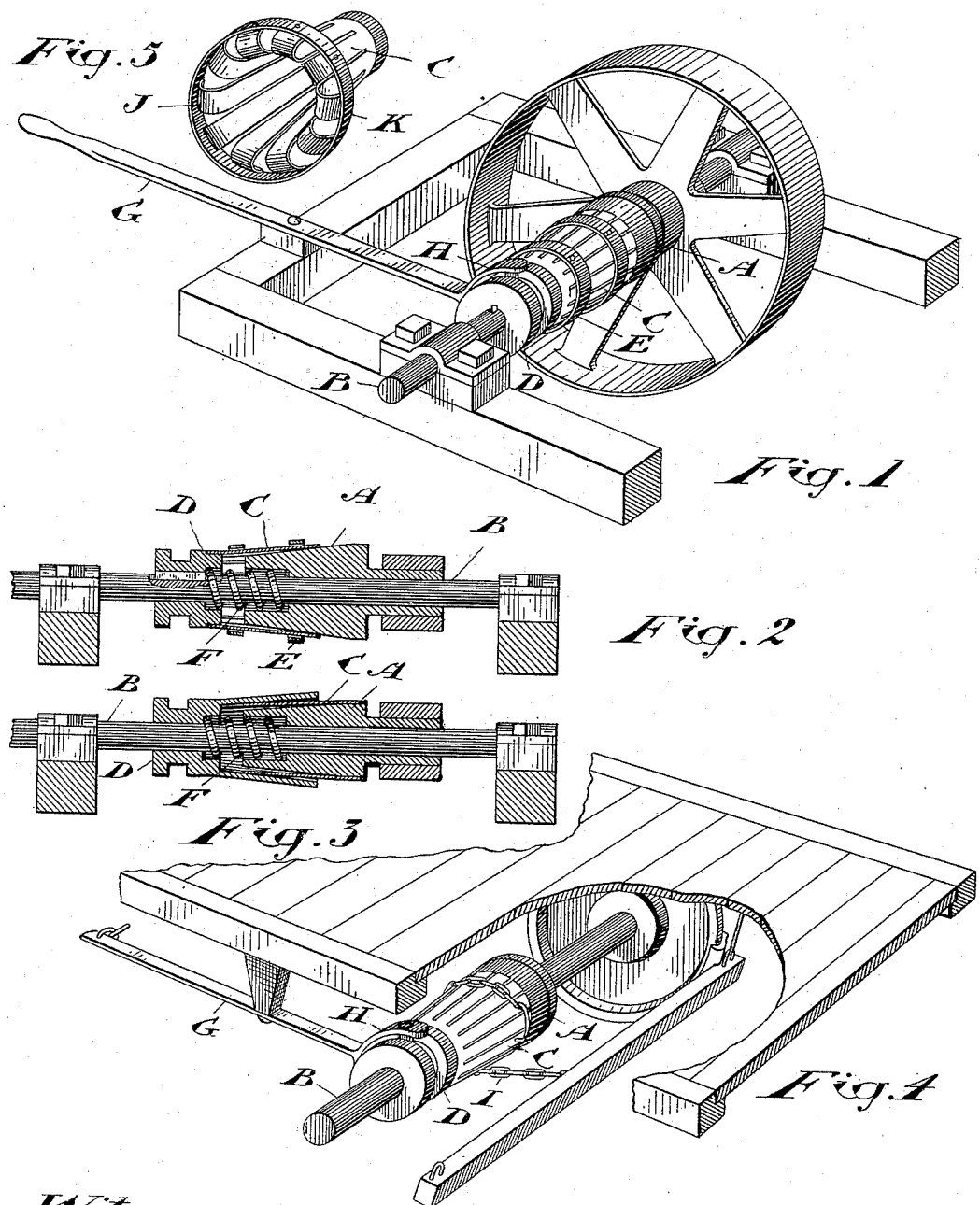
Witnesses
J. Edw. Maybee
W. G. McMillan
Inventor
Harman Bunker
by Donald C. Ridout & Co.
attys.

UNITED STATES PATENT OFFICE.

HARMAN BUNKER, OF BARRIE, CANADA, ASSIGNOR OF ONE-HALF TO JAMES HERBERT McKEGGIE, OF SAME PLACE.

CLUTCH.

SPECIFICATION forming part of Letters Patent No. 488,383, dated December 20, 1892.

Application filed May 27, 1892. Serial No. 434,532. (No model.) Patented in Canada June 1, 1892, No. 39,051.

*To all whom it may concern:*

Be it known that I, HARMAN BUNKER, inventor, of the town of Barrie, in the county of Simcoe, in the Province of Ontario, Canada, have invented a certain new and Improved Clutch Connection for Machinery, (for which I have obtained Letters Patent of the Dominion of Canada, dated June 1, 1892, No. 39,051,) of which the following is a specification.

The object of the invention is to provide an effective and easily operated clutch connection adapted for use in all classes of machinery, but specially applicable for use in the brakes of railway cars or in other cases where steady and smooth arrest of the motion is desirable, and it consists, essentially, of a series of metal flexible strips connected to one-half of a clutch and adapted to grip the cone-shaped other half upon the necessary pressure being applied; substantially as and in the manner more particularly explained and then definitely claimed.

Figure 1, is a perspective view of my improved clutch applied to an ordinary pulley. Fig. 2, is a longitudinal section of the clutch shown in Fig. 1. Fig. 3, is an alternative form of clutch. Fig. 4, illustrates my clutch applied to a car-brake. Fig. 5 is a modification.

Like letters of reference indicate corresponding parts in each figure.

A, represents a conically-shaped block which is loosely journaled upon the shaft B, when it is applied as shown in Figs. 1, 2 and 3, but in cases corresponding with the application illustrated in Fig. 4, this portion of the clutch would be secured to the shaft B. The metal strips C, extending from and fixed to the sleeve D, form the other half of the clutch. This half of the clutch, when applied as shown in Figs. 1, 2 and 3 is keyed to the shaft B, but when applied in cases such as shown in Fig. 4, it is loosely journaled on the shaft so that it will not revolve therewith, except when brought into contact with the cone-shaped block A, as hereinafter explained.

In Fig. 1, I show two rings marked E, which I rivet or otherwise connect to at least one of the strips C, so as to prevent the said strips from expanding beyond a given distance. These strips, it will be observed, extend up the conical surface of the block A, and form a series of gripping points, when the sleeve D, to which they are attached is adjusted longitudinally upon the shaft so as to force the said strips upon the cone-shaped block A, the rings E, preventing their expansion beyond a given point. By thus forming a series of gripping points and oiling the cone against which they grip, I find that I secure a smooth soft grip which will give the necessary connection without in any way jarring the machinery so connected.

In Fig. 3, I show the metal strips C, connected to the conically-shaped block A, and the sleeve D, formed like a conical cup into which the block A, and the strips C, fit, as indicated. In some classes of machinery this form of connection will be advantageous, but in any case it is the same principle as the other construction illustrated.

In Fig. 5, I show another alternative form of clutch. In this figure I show the ends of the strips C, coiled outwardly and forming a series of loops J, which are joined together by the ring K. Each strip C, will thus have an independent motion to the extent permitted by the spring in the loops J, but their spring is limited by the action of the ring K.

In order that the clutch may instantly release itself the moment that the pressure between the two halves of the clutch is removed, I place a spring F, between the block A, and sleeve D, and in order that the necessary pressure may be properly applied, I provide a pivoted lever G, connected to the sleeve D, by the fork connection H, commonly used for adjusting clutches.

In Fig. 4, I show my improved clutch-connection applied to a car. In this application I use the brake-chain I, which winds around the strips C, the instant that the sleeve D, is adjusted longitudinally to produce the necessary contact with the cone block A.

What I claim as my invention is:—

1. A clutch, comprising two sections, one of which is movable endwise, and a series of flexible metallic strips, each having one end rigidly fastened to one section of the clutch and its free end acting on the opposite section, as set forth.

2. A clutch comprising two sections, one of which is movable endwise, a series of flexible metallic strips, each having one end rigidly fastened to one section of a clutch and its free end acting on the opposite section, and means for preventing too great expansion of strips, substantially as described.

3. A clutch comprising two sections, one of which is movable, a series of flexible strips attached to one section and having its opposite ends coiled outwardly and acting on the other section, and a band surrounding the outwardly coiled ends, substantially as described.

Barrie, May 11, 1892.

HARMAN BUNKER.

In presence of—
T. BEECROFT,
O. G. JAMIESON.